Nov. 6, 1934.  A. C. VAN HOOYDONK  1,979,587
MEAT CUTTING MACHINE
Filed Jan. 14, 1932   3 Sheets-Sheet 1

Inventor,
Adrian C. Van Hooydonk,
by Walter P. Guyer
Attorney.

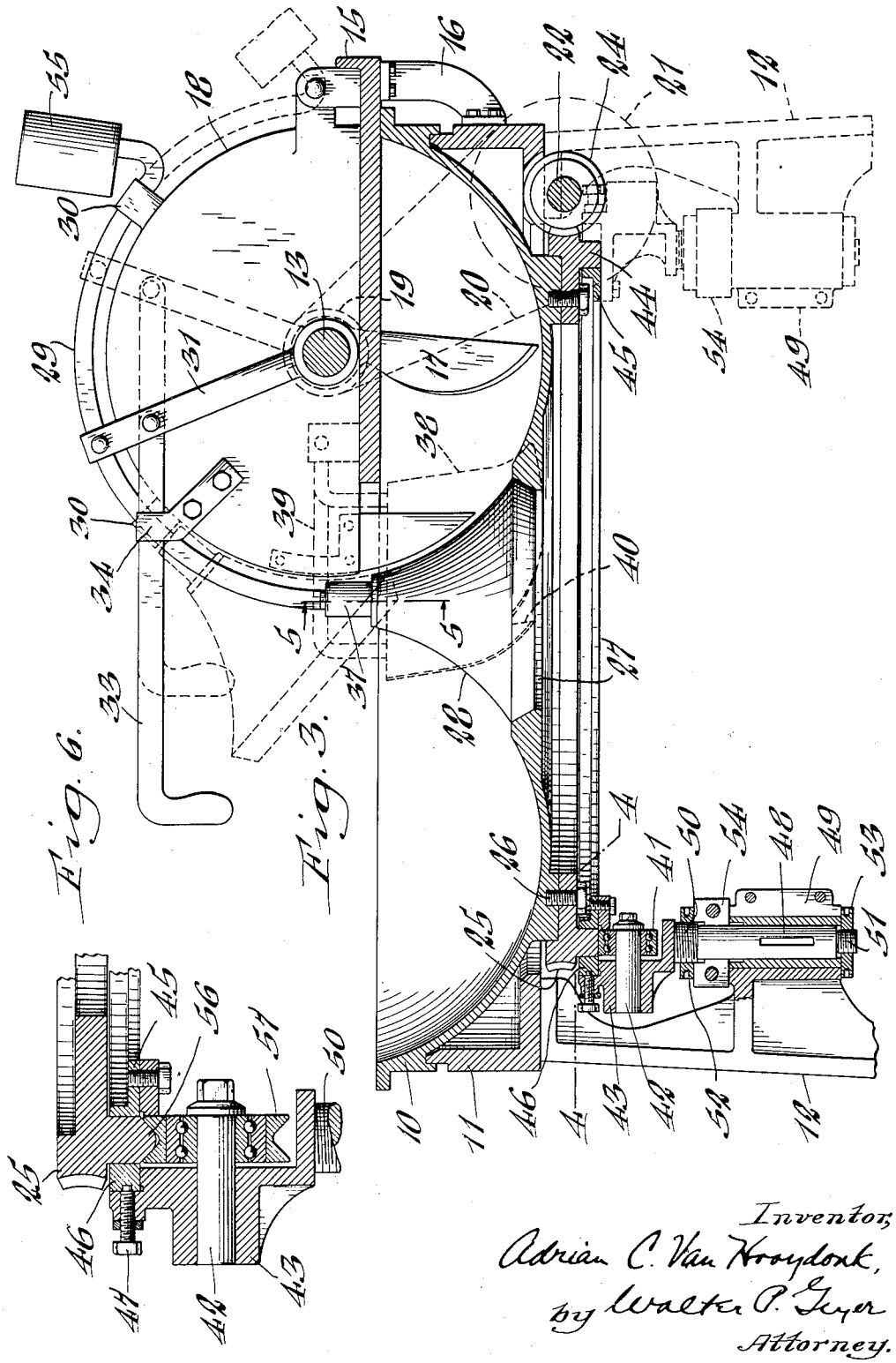

Nov. 6, 1934.          A. C. VAN HOOYDONK          1,979,587
                        MEAT CUTTING MACHINE
                  Filed Jan. 14, 1932        3 Sheets-Sheet 3
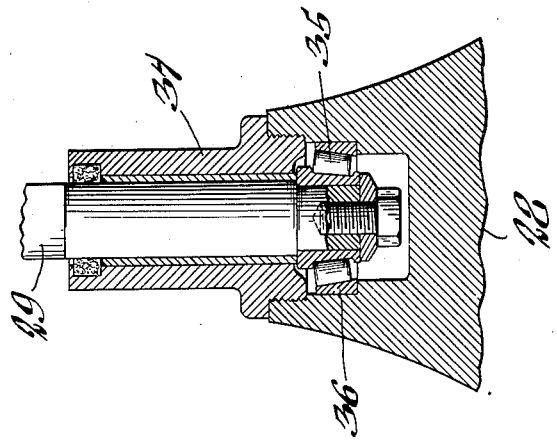
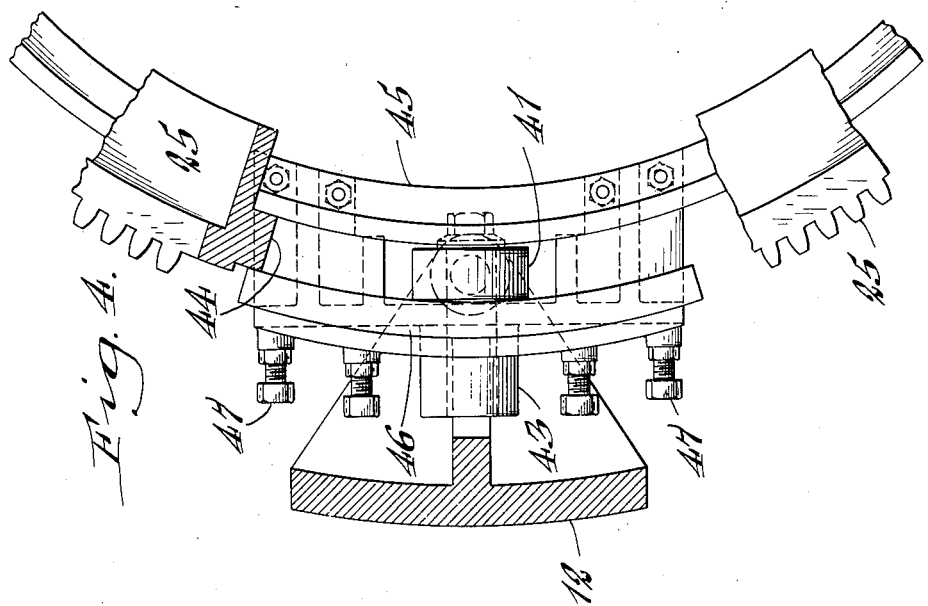

Patented Nov. 6, 1934

1,979,587

UNITED STATES PATENT OFFICE 1,979,587

MEAT CUTTING MACHINE

Adrian C. Van Hooydonk, Buffalo, N. Y., assignor to John E. Smith's Sons Company, Buffalo, N. Y., a corporation of New York Application January 14, 1932, Serial No. 586,578

16 Claims. (Cl. 146—67)

This invention relates generally to meat cutting machines of the rotary bowl type, but more particularly to improvements in the means for effecting the removal or discharge of the contents from the bowl.

One of its primary objects is to provide a machine of this character with reliable and efficient means for discharging or emptying the cut or chopped contents of the bowl from the center thereof in a sanitary manner.

Another object of the invention is the provision of a center discharge mechanism for meat cutting machines which is so designed and constructed that it does not interfere with the normal operation of the machine, which is simple, compact and inexpensive in construction, and which is easy to operate and not liable to get out of order.

Other features of the invention reside in the construction and arrangement of parts hereinafter described and particularly pointed out in the appended claims.

Figure 1:
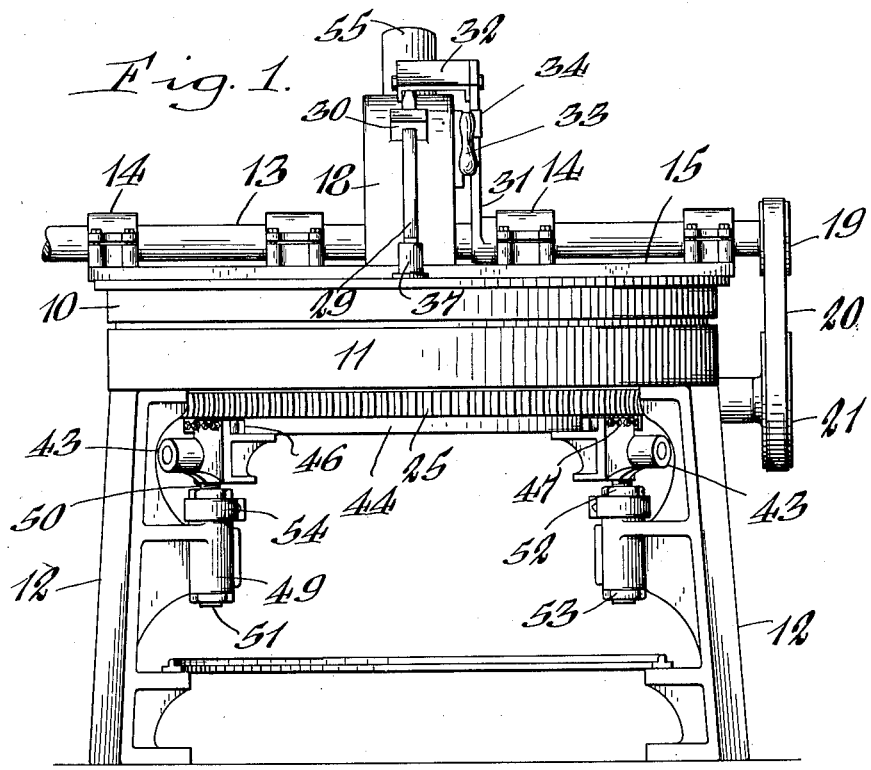
Figure 2:
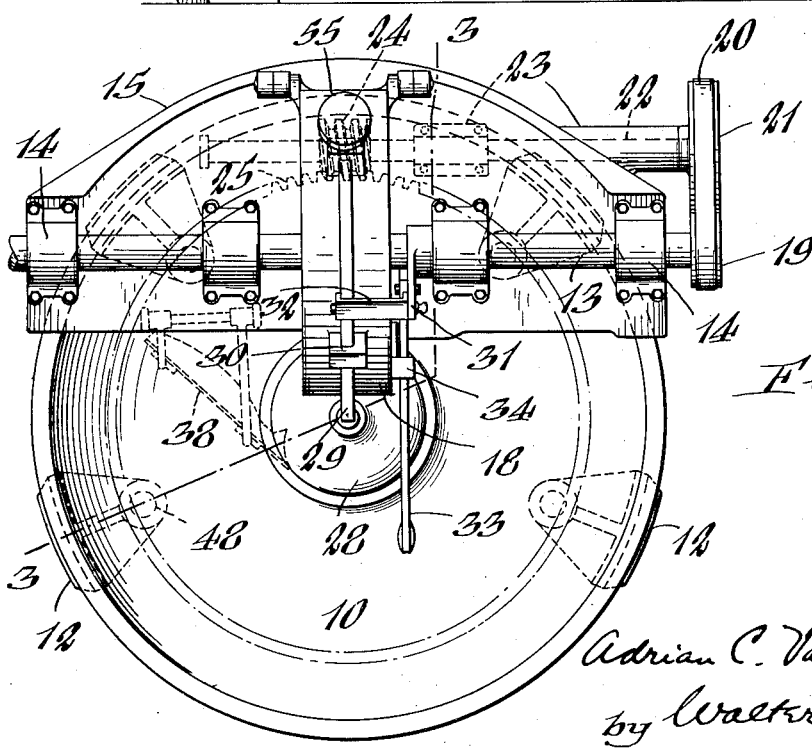

In the accompanying drawings:—Figure 1 is a front elevation of a meat cutting machine embodying my invention. Figure 2 is a top plan view thereof. Figure 3 is an enlarged cross section taken in the plane of line 3—3, Figure 2. Figure 4 is an enlarged horizontal section taken on line 4—4, Figure 3. Figure 5 is an enlarged transverse vertical section taken on line 5—5, Figure 3. Figure 6 is a detail sectional view, similar to that shown at the lower left side of Figure 3, showing a slightly modified form of bearing support for the bowl.

Similar characters of reference indicate corresponding parts throughout the several views.

In the preferred embodiment of the invention shown in the drawings, the same is depicted in connection with a meat cutting machine of the rotary bowl type, 10 indicating the meat bowl which is of the customary trough or concavo-convex form supported at its periphery on a bed ring 11 which is in turn mounted on suitable supports or legs 12, four of such legs being shown in the drawings. The numeral 13 indicates the drive shaft of the machine which is preferably disposed transversely over the meat bowl at one side of its axis and journaled in suitable bearings 14 applied to a cover plate 15 arranged over the rear portion of the bowl and supported by brackets 16 attached to the bed ring 11, as seen in Figures 2 and 3. Mounted on this shaft and extending into the bowl 10 are a plurality of knives or cutters 17 which are adapted to revolve in the meat bowl during its rotation for cutting the meats or other foods. A suitable hood or enclosure 18 is provided for enclosing the cutters.

The shaft 13 also serves to rotate the bowl 10 and for this purpose the same is provided at one end with a pulley or sprocket 19 connected by a belt or chain 20 with a companion pulley or sprocket 21 mounted on a parallel counter shaft 22 disposed beneath the bowl and journaled in appropriate bearings 23 applied to the bed ring 11 or other appropriate part of the machine. Mounted on this counter shaft is a worm 24 engaging a worm wheel 25 secured to the bottom side of the meat bowl by bolts 26.

The meat bowl 11 is provided centrally of its bottom with a discharge opening 27 through which the chopped meat or other food is emptied or dumped into a suitable receptacle provided for receiving it, the disposition of the supporting legs 12 of the machine permitting the receptacle to be readily and conveniently placed beneath the bowl or be removed thererom. This discharge opening, during the cutting operation of the machine, is closed by a suitable plug or closure 28 of substantially conical shape so as to conform substantially to the contour of the trough-shaped bowl, as shown in Figure 3. This closure is suspended over the meat bowl for movement into and out of its closed position, the construction being such that the closure is elevated over the bowl so as to leave sufficient room for the quick discharge of the chopped meat and at the same time to locate the operating mechanism of the closure where it will not in any way interfere with the dumping of the meat contents from the bowl. To this end, the closure 28 is preferably attached to or suspended from the lower end of a support or guide stem 29 which is of arcuate shape, as seen in Figure 3, and follows the contour of the semi-circular shaped cutter-hood 18. Said closure-stem engages guide blocks or elements 30 applied to the outer face of the hood for guiding the same vertically in an arcuate path. Fulcrumed on the shaft 13 alongside the hood 18 is a vertically-swinging carrier-arm or lever 31 which is connected by a suitable tie piece 32 with the closure-stem 29, so that when such carrier-arm is shifted vertically in one direction or the other, the closure 28 is accordingly moved to its open or closed position. Any appropriate means may be employed for conveniently actuating the swinging carrier-arm, that shown in the drawings, by way of example, consisting of a horizontally shiftable hand lever 33 guided for horizontal movement in a suitable bearing 34 and connected at its inner or rear end to said carrier-arm, as shown in Figure 3. It will be noted from such figure, that the body portion of the closure 28 is preferably so formed or shaped that it conforms to the curvature of the outer face of the hood 18, thereby permitting it to move in overlying relation to the hood with the desired clearance when shifting the same to its open and closed position.

In its closed position, the closure 28 is adapted to revolve with the meat bowl independently of its supporting stem 29 and for this purpose it is revolvably mounted on the lower end of its stem, which latter is provided at its lower end with a roller bearing 35 seated in a socket 36 formed in the upper end of the closure. A cap 37 is applied to the lower end of the stem in screw-threaded engagement with the upper end of the closure, as seen in Figure 5. In emptying the meat contents from the bowl 10, it is desirable to provide a deflector to direct such contents into the discharge opening as the bowl is revolved. For this purpose, I provide a suitable blade or scraper 38 which is mounted on a suitable carrier frame 39 supported on the cover plate 15 and which is adapted to swing into and out of operative position within the bowl as shown by dotted lines in Figure 3. In its operative position, this deflector blade assumes a position substantially tangential relatively to the discharge opening 27 and thereby effectually directs the chopped meat into the opening. The lower edge of this combined scraper and deflector conforms to the curvature of the meat bowl so as to effectually scrape and clean its walls of the meat contents, and its lower inner edge terminates in a foot or projection 40 which is adapted to extend into the opening in engagement with the wall thereof.

In addition to being supported on the bed ring 11, the revolving meat bowl 10 is supported on anti-friction rollers 41 journaled on horizontal arbors 42 carried by brackets 43 supported on the legs 12 of the machine. The worm wheel 25 is provided at its bottom side with an annular rim 44 which engages the peripheral faces of the rollers 41, as shown in Figure 3. Also mounted on the brackets 43 are inner and outer concentric bearing elements 45 and 46, respectively, which engage the corresponding faces of the worm wheel rib 44. The inner bearing element 45 is in the form of a ring while the outer bearing elements are in the form of segments which are adjustable radially toward and from the outer face of the rim by adjusting screws 47. These outer bearing elements receive the most wear and can be readily replaced when necessary.

The brackets 43, which support the rollers 41 and bearing elements 45, 46, are preferably carried by vertically-adjustable posts 48 guided in suitable bearings 49 which may be formed integrally with the legs. Adjacent its upper and lower ends, each post is provided with a threaded portion 50 and 51, respectively, upon which are mounted adjusting nuts 52 and 53, respectively, the lower nut bearing against the lower side of the corresponding bearing 49 to effect a lowering of the bracket 43 while the upper nut 52 abuts against the top side of a split collar 54 surrounding the shaft and interposed between the top side of the bracket 49 and the upper nut 52. By this construction, the posts 48 may be readily adjusted to effect the proper engagement of the meat bowl with its bearing elements. Should it be desired to replace the worm wheel 25, this can be readily accomplished by removing the split collars 54 from their posts 48, which permits the brackets 43 to be lowered to a position to leave sufficient clearance for the removal and application of the worm wheel.

The closure or plug 28 is held in its closed position by gravity and in order to facilitate its opening and holding in such open position, I preferably provide the opposite end of its stem with a weight 55.

In the modified arrangement of the bearing support for the meat bowl shown in Figure 6, the worm wheel 25 has its depending rim provided with a substantially V-shaped bearing face 56 which engages correspondingly grooved bearing rollers 57 mounted on the brackets 43. By this construction, these parts assist the bearing elements 45 and 46 in absorbing the side thrusts of the revolving meat bowl.

I claim as my invention:—

1. In a food cutting machine, the combination of a rotary bowl having rotary cutters arranged therein and a central discharge opening for the food, and a closure for said opening surmounting the bowl and movable over and toward and from the same about the axis of the rotary cutters into and out of its closed position.

2. In a food cutting machine, the combination of a rotary bowl having rotary cutters arranged therein and a discharge opening in its bottom, a support suspended over the bowl for movement toward and from the same about the axis of the rotary cutters to a position in substantially axial alinement with the discharge opening and to an elevated position over the same, respectively, and a closure mounted on the lower end of said support.

3. In a food cutting machine, the combination of a rotary bowl having a revolving cutter unit therefor at one side of its axis and a concentrically arranged discharge opening in its bottom, a support suspended over the bowl for movement about the axis of the cutter unit in an overhead arcuate path intersecting the bowl-axis and toward and from the top side of the bowl, and a closure for said opening mounted on the lower end of said support.

4. In a food cutting machine, the combination of a bowl having a revolving cutter unit therefor and a central discharge opening in its bottom for the food, an arcuate rod guided for movement over the bowl about the axis of said cutter unit and a closure for said opening applied to one end of said rod.

5. In a food cutting machine, the combination of a bowl having a central discharge opening in its bottom for the food, a cutter shaft disposed transversely over the bowl at one side of the discharge opening, and a vertically-swinging closure for said opening fulcrumed for movement about the axis of said cutter shaft, the closure projecting into the bowl and having the walls of its projected portion curved concentrically with the cutter shaft to clear the cutters in the open and closed position of the closure.

6. In a food cutting machine, the combination of a bowl having a central discharge opening in its bottom for the food, a vertically-swinging carrier fulcrumed above and at one side of said discharge opening, a support attached to said carrier for movement therewith about the axis of said carrier toward and from the discharge opening, a closure for said opening suspended from one end of said support and held by gravity in its closed position, and a weight applied to the other end of said support for holding the closure in its open elevated position, said closure and said weight being disposed with their line of centers passing above the axis of the carrier.

7. In a food cutting machine, the combination of a bowl having a central discharge opening in its bottom for the food, a cutter shaft disposed transversely over the bowl at one side of the discharge opening, a hood enclosing the cutters of said shaft, and a closure for said discharge opening having a support rising therefrom guided on the periphery of said hood about the axis of said cutter shaft.

8. In a food cutting machine, the combination of a bowl having a central discharge opening in its bottom for the food, a cutter shaft disposed transversely over the bowl at one side of the discharge opening, a hood enclosing the cutters of said shaft and having guide elements thereon disposed about the axis of said shaft, a closure for said discharge opening having a stem rising therefrom and engaging said guide elements, and a vertically-swinging carrier fulcrumed on said shaft and connected to said closure-stem.

9. In a food cutting machine, the combination of a bowl having a central discharge opening in its bottom for the food, a cutter shaft disposed transversely over the bowl at one side of the discharge opening, a hood of substantially semi-circular shape enclosing the cutter of said shaft, guide elements disposed along the outer edge of said hood, a vertically-swinging carrier fulcrumed on said shaft, and a closure for said discharge opening having a stem of the contour of said hood and slidingly engaging the guide elements thereof, said stem being connected to said carrier.

10. In a food cutting machine, the combination of a rotary bowl having rotary cutter arranged therein and a central discharge opening in its bottom, a closure for said opening mounted for movement about the axis of said cutters toward and from the opening into and out of its closed position, and a deflector mounted for disposition across the bowl in substantially tangential relation to said discharge opening.

11. In a food cutting machine, the combination of a rotary bowl having rotary cutter arranged therein and a central discharge opening in its bottom, a closure for said opening mounted for movement about the axis of said cutter movable toward and from the opening into and out of its closed position, and a deflector mounted for disposition across the bowl in substantially tangential relation to said discharge opening, said deflector having a portion at its inner edge arranged to engage the opening-wall.

12. In a food cutting machine, the combination of a supporting frame having anti-friction elements disposed radially thereof, a rotary meat bowl having a central discharge opening in its bottom, an annular driven element applied to the bottom side of said bowl in concentric relation with its discharge opening and engaging the peripheries of said anti-friction elements, a drive element engageable with said driven element, and concentrically disposed bearing elements applied to said frame for engagement with said driven element.

13. In a food cutting machine, the combination of a frame including upright supporting legs having horizontal bearings thereon, anti-friction rollers journaled in said bearings, a rotary meat bowl surmounting the legs and having an annular drive element applied to its bottom side and engaging the peripheries of said rollers, said drive element having a guide rim thereon, a bearing ring supported on said legs and engaging the inner face of said drive element guide rim, and segmental bearing members supported on said legs and engaging the outer face of said guide rim.

14. In a food cutting machine, the combination of a frame including upright supporting legs having upright bearings thereon, vertically adjustable brackets mounted in said bearings, anti-friction rollers mounted on said brackets, a rotary meat bowl surmounting the legs and having an annular drive element applied to its bottom side and having a downwardly facing rim thereon engaging the peripheries of said rollers, a bearing ring secured to said brackets and engaging the inner face of said drive element rim, and segmental bearing members mounted for radial adjustment on said brackets and engaging the outer face of said rim.

15. In a food cutting machine, the combination of a frame including upright supporting legs having upright bearings thereon, upright posts fitted in said bearings for adjustment vertically thereof and provided at their upper ends with brackets, anti-friction rollers mounted on said brackets, a collar applied to each of said posts between its post-bearing and its bracket, adjusting means applied to the lower end of each post and to the upper end thereof between its bracket and collar, and a rotary meat bowl surmounting the legs in supporting engagement with the peripheries of said rollers.

16. In a food cutting machine, the combination of a bowl having a revolving cutter-unit therefor and a central discharge opening in its bottom for the food, an arcuate rod guided for movement over the bowl about the axis of said cutter-unit, a closure for said discharge opening suspended from one end of said rod and held by gravity in its closed position, and means acting on the opposite end of said rod for counterbalancing the weight of the closure.

ADRIAN C. VAN HOOYDONK.